United States Patent
Broaddus et al.

(10) Patent No.: US 9,406,171 B2
(45) Date of Patent: Aug. 2, 2016

(54) DISTRIBUTED APERTURE VISUAL INERTIA NAVIGATION

(71) Applicant: DAQRI, LLC, Los Angeles, CA (US)

(72) Inventors: Christopher Broaddus, Mountain View, CA (US); Brian Mullins, Sierra Madre, CA (US); Matthew Kammerait, West Hollywood, CA (US); Austin Eliazar, Mountain View, CA (US)

(73) Assignee: DAQRI, LLC, Los Angeles, CA (US)

( * ) Notice: Subject to any disclaimer, the term of this patent is extended or adjusted under 35 U.S.C. 154(b) by 178 days.

(21) Appl. No.: 14/467,391

(22) Filed: Aug. 25, 2014

(65) Prior Publication Data

US 2016/0055673 A1    Feb. 25, 2016

(51) Int. Cl.
G06T 19/00 (2011.01)
G02B 27/01 (2006.01)
G06T 7/20 (2006.01)

(52) U.S. Cl.
CPC ............ G06T 19/006 (2013.01); G02B 27/017 (2013.01); G06T 7/20 (2013.01); *G02B 2027/014* (2013.01); *G02B 2027/0138* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 2007/0238981 A1* | 10/2007 | Zhu | A61B 90/36 600/424 |
| 2009/0248304 A1 | 10/2009 | Roumeliotis et al. | |
| 2012/0078510 A1 | 3/2012 | Ma et al. | |
| 2012/0249807 A1 | 10/2012 | Sugden | |
| 2012/0287040 A1 | 11/2012 | Moore et al. | |
| 2014/0369557 A1* | 12/2014 | Kayombya | G06K 9/00624 382/103 |

FOREIGN PATENT DOCUMENTS

WO    WO-2016032886 A1    3/2016

OTHER PUBLICATIONS

"International Application Serial No. PCT/US2015/046269, International Search Report Jan. 12, 2016", 2 pgs.
"International Application Serial No. PCT/US2015/046269, Written Opinion mailed Jan. 12, 2016", 5 pgs.
"Stable Vision-Aided Navigation for Large-Area Augmented Reality", Virtual Reality Conference (VR), Retrieved from the Internet:: <http://ieeexplore. jeee.org/xpl/articleDetails,jsp?arnumber=5759438>, (2011), 12 pgs.

* cited by examiner

*Primary Examiner* — Maurice L McDowell, Jr.
(74) *Attorney, Agent, or Firm* — Schwegman Lundberg & Woessner, P.A.

(57) ABSTRACT

A system and method for visual inertial navigation for augmented reality are described. In some embodiments, at least one camera of a wearable device generates a plurality of video frames. At least one inertial measurement unit (IMU) sensors of the wearable device generates IMU data. Features in the plurality of video frames for each camera are tracked. The plurality of video frames for each camera are synchronized and aligned based on the IMU data. A dynamic state of the wearable device is computed based on the synchronized plurality of video frames with the IMU data for each camera. Augmented reality content is generated and positioned in a display of the wearable device based on the dynamic state of the wearable device.

20 Claims, 9 Drawing Sheets

DISTRIBUTED APERTURE VISUAL INERTIA NAVIGATION

TECHNICAL FIELD

The present application relates generally to the technical field of data processing and, in various embodiments, to visual inertial navigation for augmented reality devices.

BACKGROUND

Augmented reality viewing devices allow users to observe a scene while simultaneously seeing relevant virtual content that may be aligned (beneficially) to items, images, objects, or environments in the field of view of the device or user. However, the user may move the devices relative to the items and stationary objects in space. The virtual content is therefore to be refreshed based on the new position of the device. However, the virtual content may be displayed incorrectly if the position of the augmented reality device in space is not tracked accurately.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
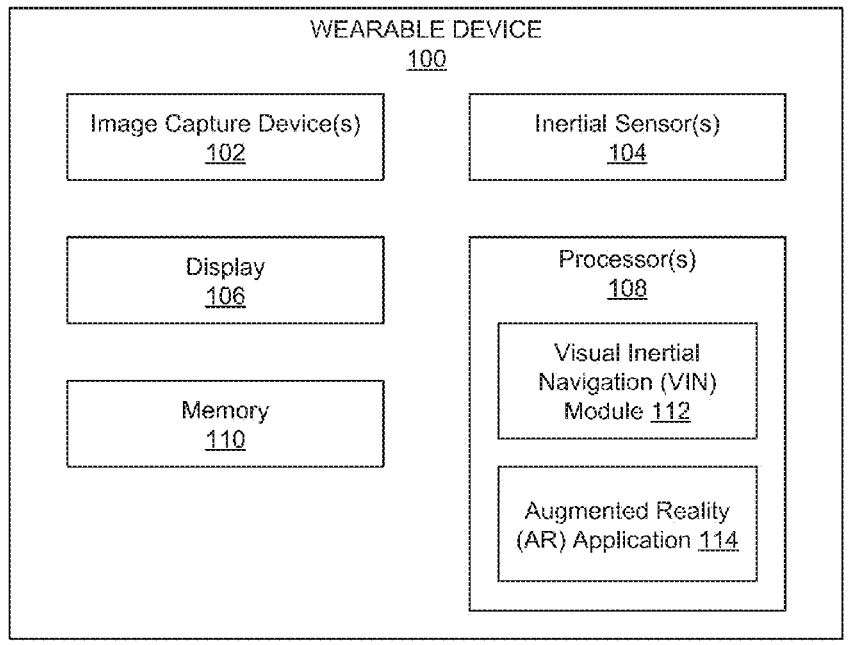
FIG. 1 is a block diagram illustrating a wearable device, in accordance with some example embodiments.

Example methods and systems of visual inertial navigation for augmented reality device are disclosed. In the following description, for purposes of explanation, numerous specific details are set forth in order to provide a thorough understanding of example embodiments. It will be evident, however, to one skilled in the art that the present embodiments may be practiced without these specific details.

The present disclosure provides techniques for visual inertial navigation for augmented reality (AR) device. An AR device may be a computing device capable of generating a display of a virtual content layered on an image of a real world object. The AR device may be a wearable device such as a helmet, a watch, a visor, eyeglasses. The AR device enables a wearer or user to view the virtual object layers on a view of real world objects. The AR device may render an image of the real world objects in a display. In another embodiment, the AR device may only render a three-dimensional (3D) model of a virtual object in a transparent visor of a helmet. The absolute position or relative position of the AR device in space may be tracked using an visual inertial navigation (VIN) module in the AR device. In some embodiments, the VIN module generates a plurality of video frames with at least one camera of a wearable device and inertial measurement unit (IMU) data with at least one IMU sensor of the wearable device. The VIN module tracks features in the plurality of video frames for each camera, synchronizes and aligns the plurality of video frames for each camera with the IMU data. The VIN module then computes a dynamic state of the wearable device based on the synchronized plurality of video frames with the IMU data. The VIN module generates and positions AR content in a display of the wearable device based on the dynamic state of the wearable device.

In some example embodiments, at least one camera is calibrated off-line for focal length, principal point, pixel aspect ratio, and lens distortion. At least one IMU sensor is calibrated for noise, scale, and bias. The calibration information is applied to the plurality of video frames and the IMU data.

In some example embodiments, the IMU data includes a measurement of an angular rate of change and a measurement of linear acceleration. The features includes stationary interest points and line features in the world. The dynamic state of the wearable device includes position data, orientation data, three-dimensional geometry data, gyroscope data, accelerometer data, gyroscope bias and scale data, and accelerometer bias and scale data.

In some example embodiments, the dynamic state is updated on every frame from at least one camera in real-time.

In some example embodiments, historical measurement data from at least one camera and IMU are accessed from the wearable device to refine real-time state estimates from the IMU sensor. A position of the AR content is adjusted in the display based on a latest dynamic state of the wearable device. The AR content may include three-dimensional graphical content. The display of the wearable device may include a transparent visor of a helmet. A location and size of a projected image of the three-dimensional graphical content is adjusted in the transparent visor based on the dynamic state of the wearable device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a wearable device 100, in accordance with some example embodiments. The wearable device 100 comprises a smart phone, a tablet computer, a wearable computing device, a vehicle computing device, or any computing device that a user that wear and carry. In some embodiments, wearable device 100 comprises a helmet with a heads-up display device. The heads-up display device is a device that provides a transparent display screen that presents content without requiring the user to look away from his or her usual viewpoint, such as with the user's head positioned up and looking forward, instead of angled down to look at a device. In some embodiments, the heads-up display device comprises an optical head-mounted display device, which may include, but is not limited to, a helmet mounted display device, glasses (e.g., Google Glass®), or other temporary or permanent form factors that can be either binocular or monocular. However, it is contemplated that other types of wearable devices 100 are also within the scope of the present disclosure. In some embodiments, the wearable device 100 comprises one or more image capture devices 102, an inertial sensor 104, a display 106, memory 110, and one or more processors 108.

In some embodiments, the image capture device(s) 102 comprises a built-in camera or camcorder with which a user of the wearable device 100 can use to capture image data of visual content in a real-world environment (e.g., a real-world physical object). The image data may comprise one or more still images or video. As will be discussed in further detail herein, the image capture device(s) 102 can also be used to capture image data related to the positioning or orientation of at least one of the user's eyes, such as a gaze direction of the user's eyes (e.g., where the user is looking or the rotational position of the user's eyes relative to the user's head or some other point of reference). Other configurations of the image capture device(s) 102 are also within the scope of the present disclosure.

In some embodiments, the inertial sensor(s) 104 comprises an inertial measurement unit (IMU) sensor such as an accelerometer and/or a gyroscope with which a user of the wearable device 100 can track a position of the wearable device 100 over time. For example, the inertial sensor 104 measures an angular rate of change and linear acceleration of the wearable device 100. The position of the wearable device 100 can then be used to generate and display AR content in the display 106. The location of the AR content within the display 106 may also be adjusted based on the dynamic state (e.g., position and orientation) of the wearable device 100 in space over time relative to stationary objects sensed by the image capture device(s) 102.

In some embodiments, the display screen 106 is configured to display the image data captured by the image capture device 102. In some embodiments, the display screen 106 is transparent or semi-opaque so that the user of the wearable device 100 can see through the display screen 106 to the visual content in the real-world environment.

In some embodiments, a visual inertial navigation (VIN) module 112 is stored in memory 110 or implemented as part of the hardware of the processor(s) 108, and is executable by the processor(s) 108. Although not shown, in some embodiments, the VIN module 112 may reside on a remote server and communicate with the wearable device 100 via a network. The network may be any network that enables communication between or among machines, databases, and devices. Accordingly, the network may be a wired network, a wireless network (e.g., a mobile or cellular network), or any suitable combination thereof. The network may include one or more portions that constitute a private network, a public network (e.g., the Internet), or any suitable combination thereof.

The VIN module 112 computes the position and orientation of the wearable device 100. In one embodiment, given N wearable devices (1 or more cameras on each wearable device) over time, M stationary points tracked over time, and the gyroscope and accelerometer data over time, the VIN module 112 solves for the position and orientation of the wearable devices. The stationary points may be used as constraints with the inertial information to compute the position and orientation of the wearable devices.

The VIN module 112 accesses the following data in order to compute the position and orientation of the wearable device 100 in space over time: Stationary world points ($x_i$, $y_i$, $z_i$) where i represents the $i^{th}$ world point, Gyroscope measurements ($g_{xt}$, $g_{yt}$, $g_{zt}$).
Accelerometer measurements ($a_{xt}$, $a_{yt}$, $a_{zt}$).
Gyroscope bias ($bg_{xt}$, $bg_{yt}$, $bg_{zt}$) and
Accelerometer bias ($ba_{xt}$, $ba_{yt}$, $ba_{zt}$) where t is time.

The VIN module 112 may generate a 3D map that consists of an (x,y,z) for each stationary point in the real physical world being tracked.

In some example embodiments, the wearable device 100 may consist of one or more image capture devices 102 (e.g., camera) mounted on a rigid platform with one or more Inertial Navigation Unit (IMU) sensor. The image capture devices 102 can be mounted with non-overlapping (distributed aperture) or overlapping (stereo or more) fields-of-view.

In some example embodiments, the VIN module 112 includes an algorithm that combines inertial information from the inertial sensor(s) 104 and one or more image capture device(s) 102 in close proximity and coupled to a rigid platform or a rig. In one embodiment, a rig may consist of multiple cameras mounted on a rigid platform with an inertial navigation unit. A rig may thus have at least one inertial navigation unit and at least one camera.

In some example embodiments, an augmented reality (AR) application 114 is stored in memory 110 or implemented as part of the hardware of the processor(s) 108, and is executable by the processor(s) 108. The AR application 114 may provide the user 102 with an AR experience triggered by identified objects in a physical environment. The physical environment may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment. The AR application 114 may include computer vision recognition to determine corners, objects, lines, and letters. Example components of the AR application 114 are described in more detail below with respect to FIG. 2B.

The inertial sensor(s) 104 measures angular rate of change and linear acceleration. The image capture device(s) are used in a tracking system that tracks features in the video images. The image features could be corner or blob features extracted from the image. For example, first and second local patch differentials over the image could be used to find corner and blob features. The tracked image features are used to infer 3D geometry of the environment and are combined with the inertial information to estimate position and orientation of the wearable device 100.

For example, the 3D location of a tracked point is computed by triangulation that uses the observation of the 3D point in all cameras over time. The 3D estimate is improved as additional evidence or data is accumulated over time. The VIN module 112 minimizes the re-projection of the 3D points into the cameras over time, and the residual between the estimate and the IMU propagation estimate. The IMU propagation solves the differential equations from an estimated rig state used as an initial starting point at time k and propagating the state to the next rig at k+1 using the gyroscope and accelerometer data between the rigs.

In some embodiments, the VIN module 112 is used to accurately localize the wearable device 100 in space and simultaneously map the 3D geometry of the space around the wearable device 100. The position and orientation of the wearable device 100 can be used in an Augmented Reality System by knowing precisely where the wearable device 100 is in real-time and with low-latency to project a virtual world into a display system of the AR system or the display 106 of the wearable device 100. The relation between the IMU/Camera and the Display System is known and calibrated off-line during a calibration process. The calibration process consists of observing a known 2D or 3D pattern in the world in all the cameras on the wearable device 100 and IMU data over several frames. The pattern is detected in every frame and used to estimate the placement of the cameras and IMU on the wearable device 100.

Figure 2A:
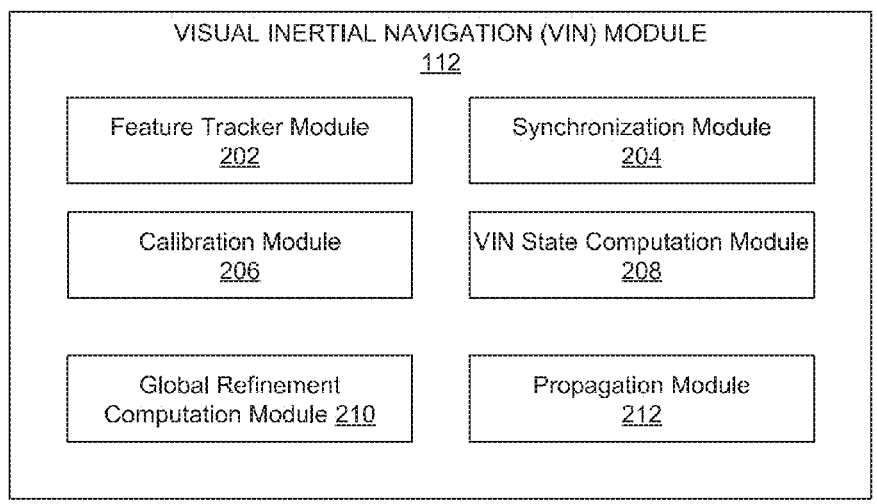
FIG. 2A is a block diagram illustrating a visual inertial navigation (VIN) module, in accordance with some example embodiments.

FIG. 2A illustrates an example embodiment of the VIN module 112 that includes a feature tracker module 202, a synchronization module 204, a calibration module 206, a VIN state computation module 208, a global refinement computation module 210, and a propagation module 212.

The feature tracker module 202 tracks features in video frames for each camera. There is one feature tracker for each image capture device(s) 102. The feature tracker module 202 receives the video frames and tracks features in the image over time. The features could be interest points or line features. The feature tracker consists of extracting a local descriptor around each feature and matching it to subsequent camera frames. The local descriptor could be a neighborhood pixel patch that is matched by using for example, Normalized Cross-Correlation (NCC).

The synchronization module 204 aligns the video frames and IMU data according to time as the information may arrive asynchronously. The camera frames and IMU data contain a timestamp of when the data was captured. The timestamps are used to align the data by time so that the VIN module 112 can process the data in temporal order.

The calibration module 206 calibrates the image capture device 102 calibrated off-line for focal length, principal point, pixel aspect ratio, lens distortion and extrinsic calibration. Furthermore, the calibration module 206 calibrates the inertial sensor 102 for noise, scale and bias, and extrinsic calibration. In some embodiments, a calibration process is performed on the components of the wearable device 100 prior to performance of the operations, such as prior to the performance of the operations of method 600 in FIG. 6, the operation of method 700 in FIG. 7, or the operations of method 800 in FIG. 8. This calibration process may comprise the calibration of any sensors, display surfaces, image capture devices, and projectors of the wearable device 100 so that they are all synchronized, running off of the same clock, and knowing the attributes (e.g., location, positioning) of each other in order to facilitate their working together as a cohesive unit. The calibration module 206 also applies the calibration information to the data.

The VIN state computation module 208 is configured to combine the tracked feature information from all the image capture device(s) 102 and the inertial sensor(s) 104 to estimate the state consisting of position, orientation, 3D geometry, and gyroscope and accelerometer bias and scale. The sensor state information is computed by an optimization process that maximizes the probability of the state using tracks from the feature tracker modules 504 and inertial data from the IMU module 508. The probability is a function of the re-projection error of the triangulated feature points as the camera moves through space, and the inertial constraints from the IMU. The probability can be maximized by different methods, for example, Bundle Adjustment, Particle Filter or Kalman Filter. In some example embodiments, the VIN state computation module 208 updates the state on every frame from the camera system or image capture device(s) 102 in real-time.

The global refinement module 210 refines the real-time estimates from the VIN state computation module 208 using global information. Global information consists of more accurate 3D geometry previously estimated from the wearable device 100, or additional sensors such as Time-of-Flight (ToF) and Structured Light. Since the VIN state computation module 208 operates with relatively low-latency, the VIN state computation module 208 is constrained by how much information it can use to produce an estimate. As such, the global refinement computation module 210 uses all the available historical information to produce more accurate position, orientation and 3D geometry. The global refinement computation module 210 can use computationally more expensive techniques to refine the estimates of the states. Global Bundle Adjustment or Particle Filters are examples of techniques to solve the global refinement problem.

The propagation module 212 uses the latest inertial sensor data (gyroscope and accelerometer bias and scale) from the VIN state computation module 208 to estimate the position and orientation of the wearable device 100 with very low-latency for the display 106. The propagation module 516 integrates the IMU data from the latest known state estimate of the wearable device 100 to compute a low latency state estimate. The display 106 uses the state information to render graphical content on the display 106 so that it is registered to the environment with low-latency and little or no jitter.

Figure 2B:
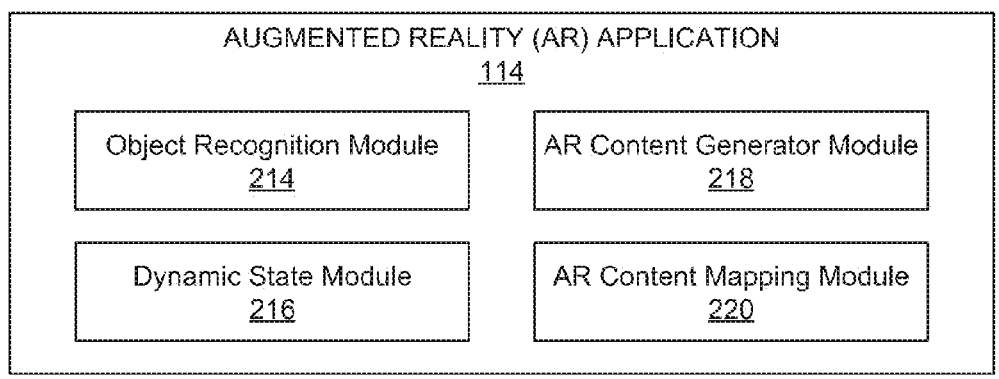
FIG. 2B is a block diagram illustrating an augmented reality application (AR) module, in accordance with some example embodiments.

FIG. 2B is a block diagram illustrating the AR application 114, in accordance with some example embodiments. The AR application 114 includes an object recognition module 214, a dynamic state module 216, an AR content generator module 218, and an AR content mapping module 220.

The object recognition module 214 identifies objects that the wearable device 100 is pointed to. The object recognition module 214 may detect, generate, and identify identifiers such as feature points of a physical object being viewed or pointed at by the wearable device 100 using the image capture device 102 to capture the image of the physical object. As such, the object recognition module 210 may be configured to identify one or more physical objects. In one example embodiment, the object recognition module 214 may identify objects in many different ways. For example, the object recognition module 214 may determine feature points of the object based on several image frames of the object. The identity of the object is also determined by using any visual recognition algorithm. In another example, a unique identifier may be associated with the object. The unique identifier may be a unique wireless signal or a unique visual pattern such that the object recognition module 214 can look up the identity of the object based on the unique identifier from a local or remote content database.

The dynamic state module 216 receives data identifying the latest dynamic state (position and orientation) of the wearable device 100 from the VIN module 112.

The AR content generator module 218 generates AR content based on an identification of the object. For example, the AR content may include visualization of data related to the object. The visualization may include rendering a 3D object (e.g., a virtual arrow on a floor), a 2D object (e.g., an arrow or symbol next to a machine), displaying other objects in different colors visually perceived on other physical devices.

The AR content mapping module 220 maps the location of the AR content to be displayed in the display 106 based on the dynamic state. As such, the AR content may be accurately displayed based on a relative position of the wearable device 100 in space or in a physical environment. When the user moves, the inertial position of the wearable device 100 is tracked and the display of the AR content is adjusted based on the new inertial position. For example, the user may view a virtual object visually perceived to be on a physical table. The position, location, and display of the virtual object is updated in the display 106 as the user moves around the physical table (e.g., away from, closer to, around).

Figure 3:
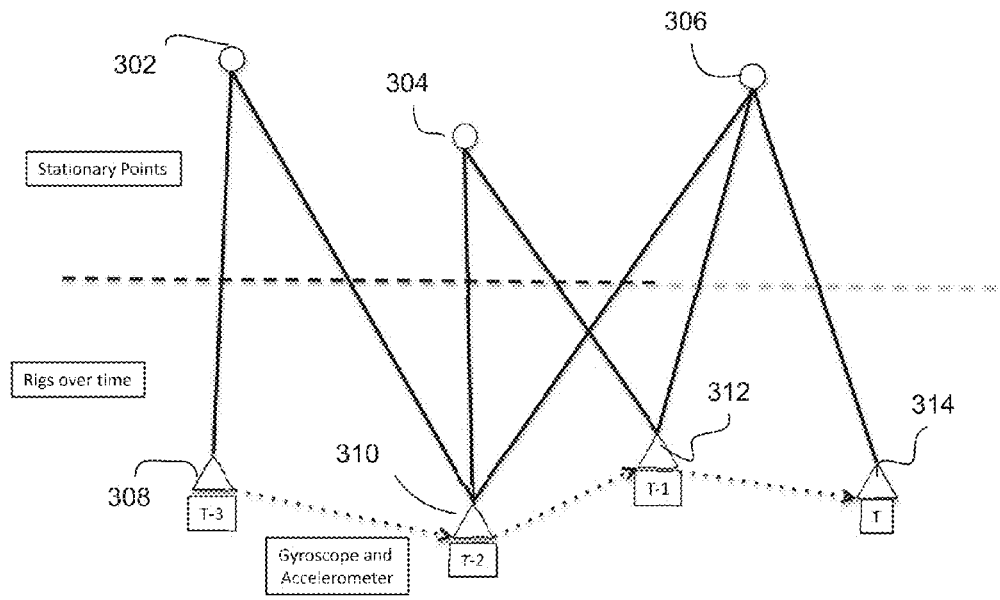
FIG. 3 illustrates inertial tracking of a wearable device relative to stationary points, in accordance with some example embodiments.

FIG. 3 illustrates inertial tracking of the wearable device 100 relative to stationary points, in accordance with some embodiments. The points 302, 304 and 306 are stationary relative to the rigs 308, 310, 312 and 314 over time. In this example, point 302 can be observed by rig 308 and 310. The gyroscope and accelerometer data connect the rig 308 to 310, 310 to 312 and 312 to 314.

Figure 4:
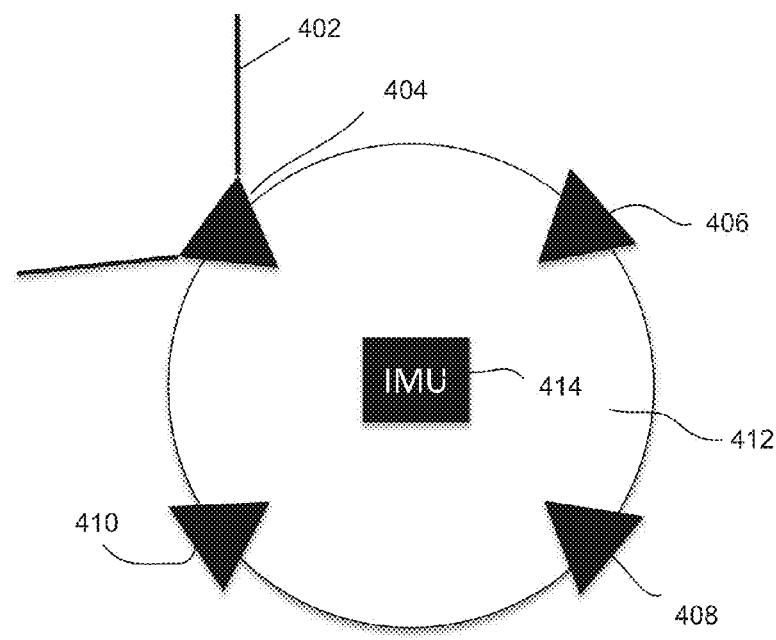
FIG. 4 illustrates an example of a wearable device incorporating visual inertial navigation, in accordance with some example embodiments.

FIG. 4 illustrates an example of a VIN wearable device 412 incorporating visual inertial navigation, in accordance with some embodiments. The VIN wearable device 412 includes an IMU 414 and four cameras 404, 406, 408, 410 disposed around the VIN wearable device 412 to capture overlapping field of views 402.

Figure 5:
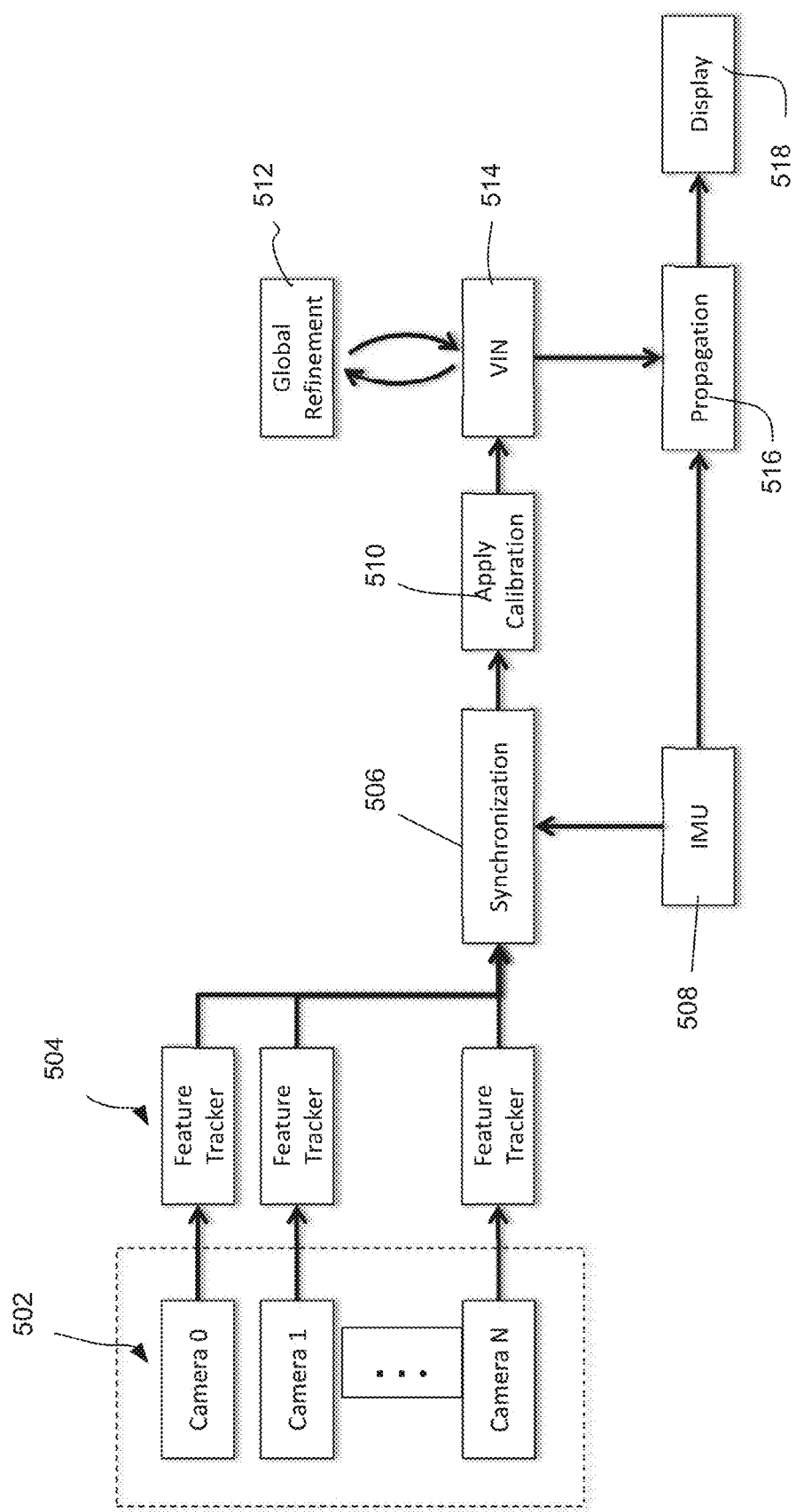
FIG. 5 is a block diagram illustrating an example architecture of visual inertial navigation, in accordance with some example embodiments.

FIG. 5 is a block diagram illustrating an example architecture of visual inertial navigation, in accordance with some embodiments. A system may include several cameras 502. A feature tracker 504 is associated with each camera. Each feature tracker 504 tracks features from video frames from the corresponding camera 502. The synchronization module 506 synchronizes data from the feature trackers 504 and data from the IMU module 508. A calibration module 510 applies calibration to the synchronized data. The VIN module 514 generates a state that is adjusted with global refinement 512. A propagation module 516 outputs the best estimate of the state to the display 518.

Figure 6:
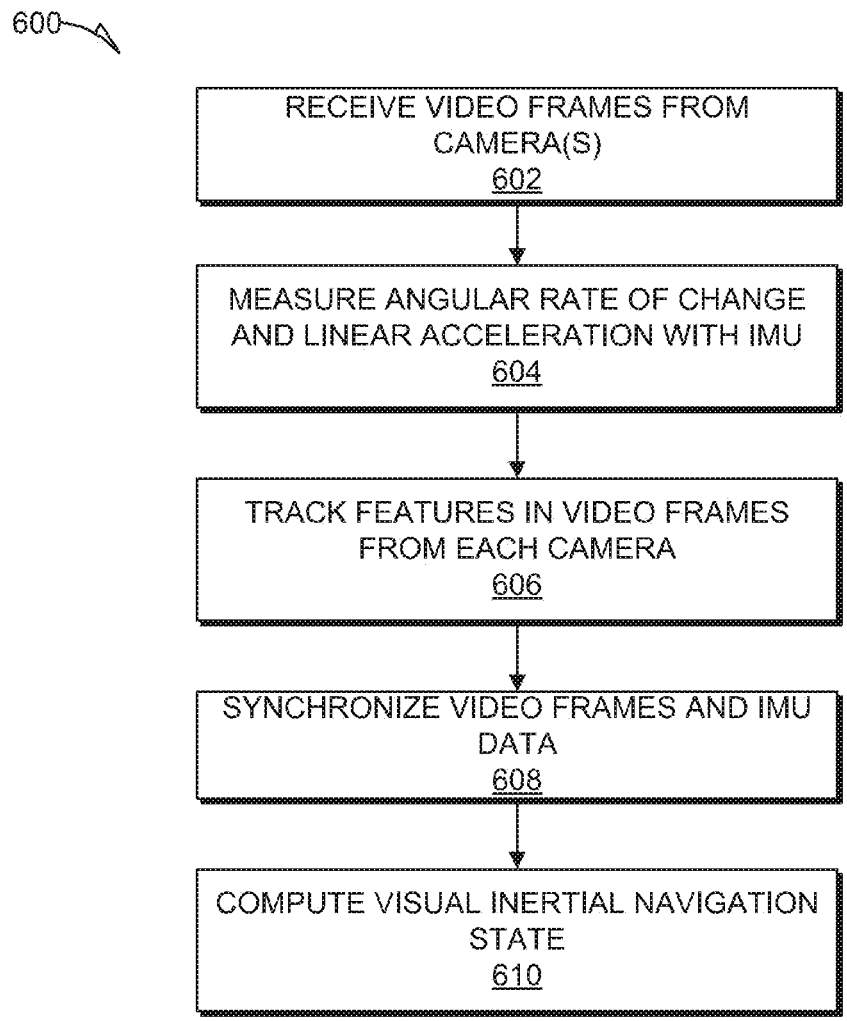
FIG. 6 is a flowchart illustrating a method for visual inertial navigation, in accordance with some example embodiments.

FIG. 6 is a flowchart illustrating a method 600 for visual inertial navigation, in accordance with some embodiments. At operation 602, the VIN module 112 generates video frames from cameras. In some example embodiment, operation 602 may be implemented with the image capture sensor(s) 102. The image capture sensor(s) 102 generates the video frames.

At operation 604, the VIN module 112 measures the angular rate of change and linear acceleration is measured. In some example embodiment, operation 604 may be implemented using the inertial sensor(s) 104.

At operation 606, the VIN module 112 tracks features in video frames from each camera. In some example embodiment, operation 606 is implemented using the feature tracker module 202.

At operation 608, the VIN module 112 synchronizes video frames with the IMU data. In some example embodiment, operation 608 is implemented using the synchronization module 204.

At operation 610, the VIN module 112 computes a VIN state based on the synchronized video frames. In some example embodiment, operation 610 is implemented using the VIN state computation module 208.

Figure 7:
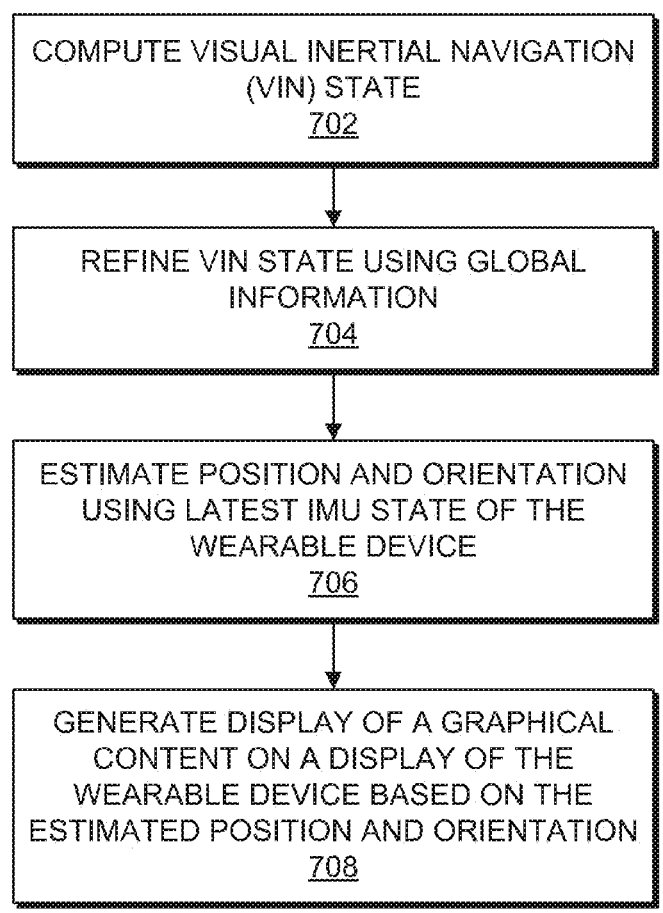
FIG. 7 is a flowchart illustrating a method of generating an augmented reality content using the visual inertial navigation, in accordance with some example embodiments.

FIG. 7 is a flowchart illustrating a method 700 of generating an augmented reality content using the visual inertial navigation, in accordance with some embodiments. At operation 702, the VIN module 112 computes a VIN state. In some example embodiment, operation 702 is implemented using the VIN state computation module 208.

At operation 704, the VIN module 112 refines the VIN state using global information. In some example embodiment, operation 704 is implemented using the global refinement computation module 210.

At operation 706, the VIN module 112 estimates the position and orientation of the wearable device 100 using the latest IMU state of the wearable device 100. In some example embodiment, operation 706 is implemented using the global refinement computation module 208.

At operation 708, the VIN module 112 generates a display of a graphical content on the display 106 of the wearable device 100 based on the estimated position and orientation of the wearable device 100. In some example embodiment, operation 708 is implemented using the propagation module 212.

Figure 8:
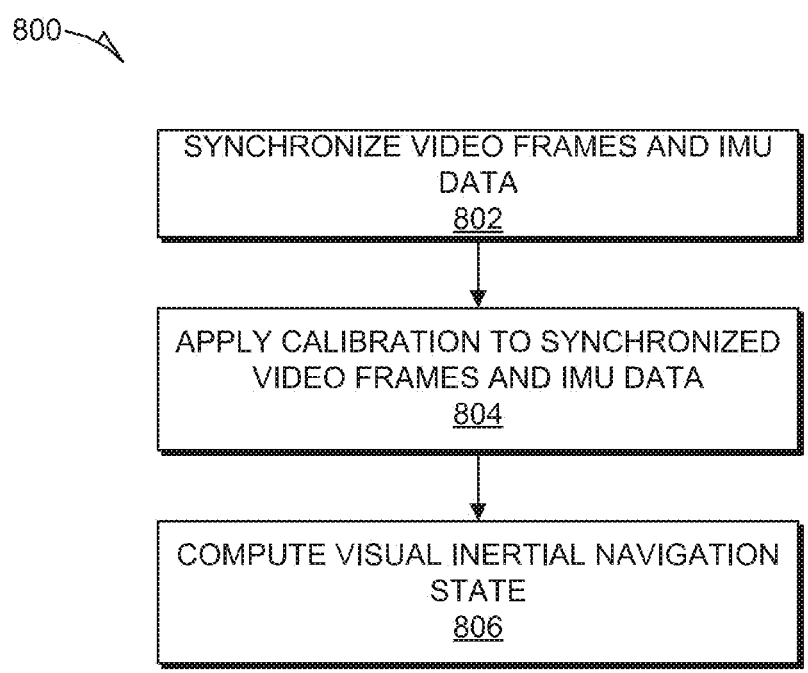
FIG. 8 is a flowchart illustrating a method for visual inertial navigation, in accordance with some example embodiments.

FIG. 8 is a flowchart illustrating a method 800 for visual inertial navigation, in accordance with some embodiments. At operation 802, the VIN module 112 synchronizes video frames with IMU data. In some example embodiment, operation 802 is implemented using the synchronization module 204.

At operation 804, the VIN module 112 applies calibration to the synchronized video frames and IMU data. In some example embodiment, operation 804 is implemented using the calibration module 206.

At operation 806, the VIN module 112 computes a VIN state. In some example embodiment, operation 806 is implemented using the VIN state computation module 208.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 214 of FIG. 2) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
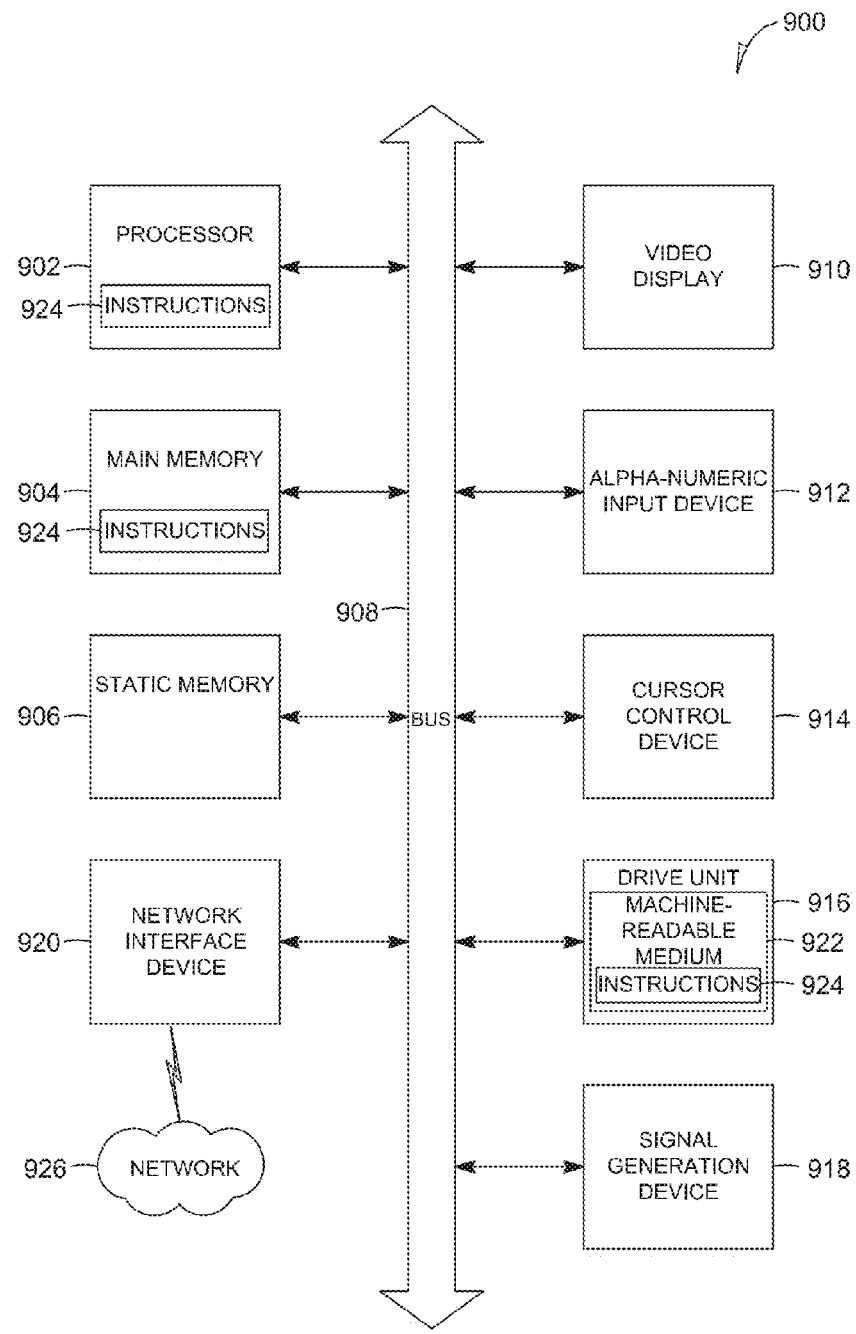
FIG. 9 is a block diagram of an example computer system on which methodologies described herein may be executed, in accordance with some example embodiments.

FIG. 9 is a block diagram of a machine in the example form of a computer system 900 within which instructions 924 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 10:
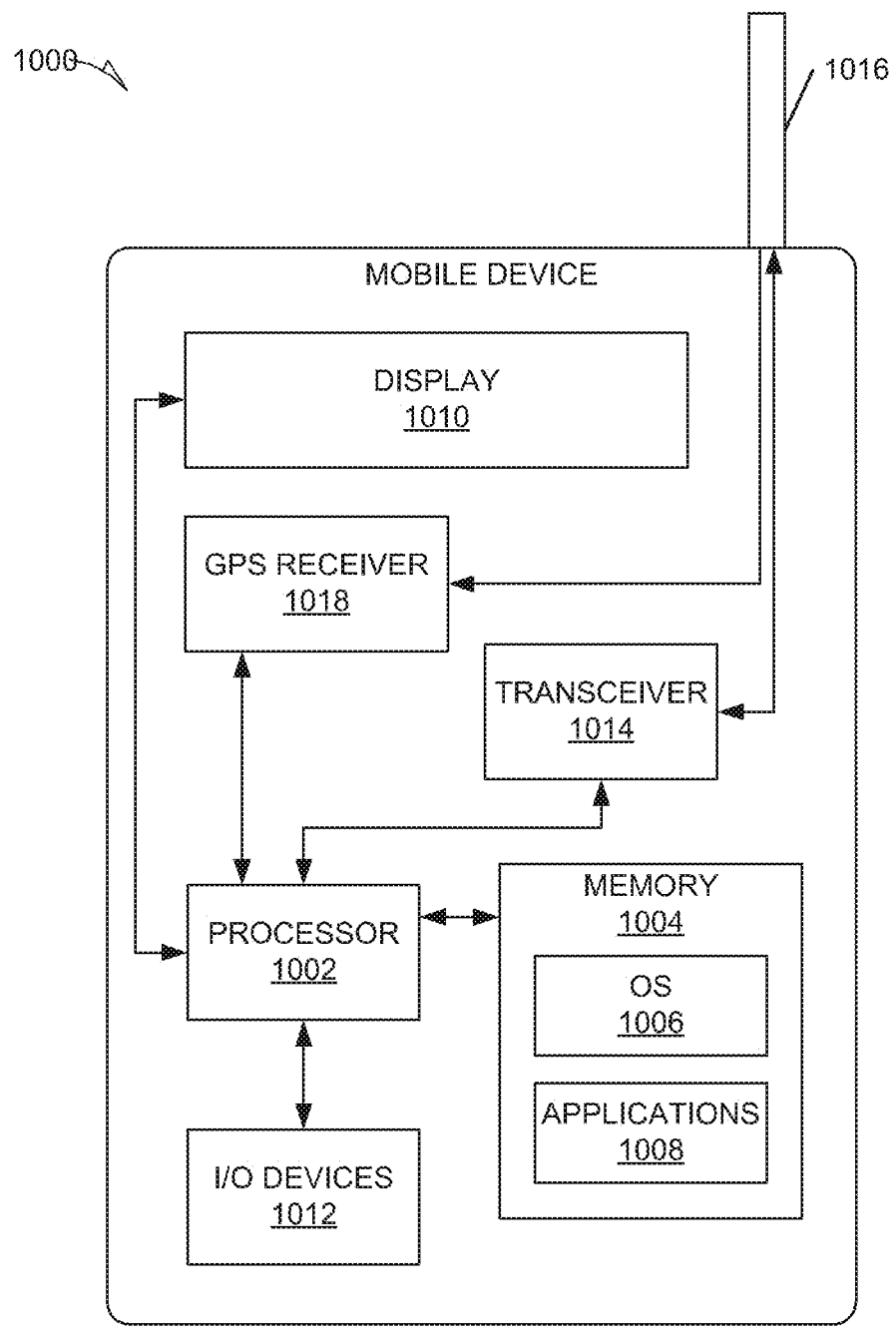
FIG. 10 is a block diagram illustrating a mobile device, in accordance with some example embodiments.

FIG. 10 is a block diagram illustrating a mobile device 1000 that may employ the VIN state computation features of the present disclosure, according to an example embodiment. The mobile device 1000 may include a processor 1002. The processor 1002 may be any of a variety of different types of commercially available processors 1002 suitable for mobile devices 1000 (for example, an XScale architecture microprocessor, a microprocessor without interlocked pipeline stages (MIPS) architecture processor, or another type of processor 1002). A memory 1004, such as a random access memory (RAM), a flash memory, or other type of memory, is typically accessible to the processor 1002. The memory 1004 may be adapted to store an operating system (OS) 1006, as well as application programs 1008, such as a mobile location enabled application that may provide LBSs to a user 102. The processor 1002 may be coupled, either directly or via appropriate intermediary hardware, to a display 1010 and to one or more input/output (I/O) devices 1012, such as a keypad, a touch panel sensor, a microphone, and the like. Similarly, in some embodiments, the processor 1002 may be coupled to a transceiver 1014 that interfaces with an antenna 1016. The transceiver 1014 may be configured to both transmit and receive cellular network signals, wireless data signals, or other types of signals via the antenna 1016, depending on the nature of the mobile device 1000. Further, in some configurations, a GPS receiver 1018 may also make use of the antenna 1016 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A wearable device comprising:
   at least one camera configured to capture an image and generate a plurality of video frames;
   at least one inertial measurement unit (IMU) sensor configured to generate IMU data of the wearable device;
   a feature tracking module configured to track at least one feature in the plurality of video frames for each camera;
   a synchronization module configured to synchronize and align the plurality of video frames for each camera based on the IMU data;
   a visual inertial navigation (VIN) module, executable by at least one hardware processor, configured to compute a dynamic state of the wearable device based on the synchronized plurality of video frames with the IMU data; and an augmented reality content module configured to generate and position augmented reality content in a display of the wearable device based on the dynamic state of the wearable device.

2. The wearable device of claim 1, further comprising:
a calibration module configured to calibrate the at least one camera off-line for focal length, principal point, pixel aspect ratio, lens distortion, and to calibrate the at least one IMU sensor for noise, scale, and bias, and to apply the calibration information to the plurality of video frames and the IMU data.

3. The wearable device of claim 1, wherein the IMU data comprises an angular rate of change and a linear acceleration.

4. The wearable device of claim 1, wherein the features comprises predefined stationary interest points and line features.

5. The wearable device of claim 1, wherein the dynamic state of the wearable device comprises position data, orientation data, three-dimensional geometry data, gyroscope data, and accelerometer bias and scale data.

6. The wearable device of claim 1, wherein the VIN module updates the dynamic state on every frame from the at least camera in real-time.

7. The wearable device of claim 1, further comprising:
a global refinement module configured to access historical dynamic states from the wearable device to refine real-time state estimates from the IMU sensor.

8. The wearable device of claim 1, further comprising:
a propagation module configured to adjust a position of the augmented reality content in the display based on a latest dynamic state of the wearable device.

9. The wearable device of claim 1, wherein the augmented reality content comprises three-dimensional graphical content.

10. The wearable device of claim 1, wherein the display of the wearable device includes a transparent visor of a helmet.

11. A computer-implemented method comprising:
generating a plurality of video frames with at least one camera of a wearable device;
generating inertial measurement unit (IMU) data with at least one IMU sensor of the wearable device;
tracking at least one feature in the plurality of video frames for each camera;
synchronizing and aligning the plurality of video frames for each camera based on the IMU data;
computing, by a hardware processor of a machine, a dynamic state of the wearable device based on the synchronized plurality of video frames with the IMU data; and
generating and positioning augmented reality content in a display of the wearable device based on the dynamic state of the wearable device.

12. The computer-implemented method of claim 11, further comprising:
calibrating the at least one camera off-line for focal length, principal point, pixel aspect ratio, lens distortion;
calibrating the at least one IMU sensor for noise, scale, and bias; and
applying the calibration information to the plurality of video frames and the IMU data.

13. The computer-implemented method of claim 11, wherein the IMU data comprises an angular rate of change and a linear acceleration.

14. The computer-implemented method of claim 11, wherein the features comprises predefined stationary interest points and line features.

15. The computer-implemented method of claim 11, wherein the dynamic state of the wearable device comprises position data, orientation data, three-dimensional geometry data, gyroscope data, and accelerometer bias and scale data.

16. The computer-implemented method of claim 11, further comprising:
updating the dynamic state on every frame from the at least camera in real-time.

17. The computer-implemented method of claim 11, further comprising:
accessing historical dynamic states from the wearable device to refine real-time state estimates from the IMU sensor.

18. The computer-implemented method of claim 11, further comprising:
adjusting a position of the augmented reality content in the display based on a latest dynamic state of the wearable device.

19. The computer-implemented method of claim 11, wherein the augmented reality content comprises three-dimensional graphical content, the display of the wearable device including a transparent visor of a helmet, a location and size of a projected image of the three-dimensional graphical content adjusted in the transparent visor based on the dynamic state of the wearable device.

20. A non-transitory machine-readable storage medium, tangibly embodying a set of instructions that, when executed by at least one processor, causes the at least one processor to perform a set of operations comprising:
generating a plurality of video frames with at least one camera of a wearable device;
generating inertial measurement unit (IMU) data with at least one IMU sensor of the wearable device;
tracking at least one feature in the plurality of video frames for each camera;
synchronizing and aligning the plurality of video frames for each camera based on the IMU data;
computing a dynamic state of the wearable device based on the synchronized plurality of video frames with the IMU data; and
generating and positioning augmented reality content in a display of the wearable device based on the dynamic state of the wearable device.

* * * * *